(12) United States Patent
Murata et al.

(10) Patent No.: US 8,038,818 B2
(45) Date of Patent: Oct. 18, 2011

(54) CONNECTION METHOD OF THERMOPLASTIC RESIN LONG BODY

(75) Inventors: Shinji Murata, Chiyoda-ku (JP); Yoshiyasu Ogata, Chiyoda-ku (JP); Jinichi Furukawa, Chiyoda-ku (JP); Yoshio Ochi, Chiyoda-ku (JP); Keizo Makino, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 126 days.

(21) Appl. No.: 12/388,700

(22) Filed: Feb. 19, 2009

(65) Prior Publication Data
US 2010/0051174 A1 Mar. 4, 2010

(30) Foreign Application Priority Data
Sep. 1, 2008 (JP) ................. 2008-223520

(51) Int. Cl.
*B29C 65/00* (2006.01)
*F16G 3/10* (2006.01)
(52) U.S. Cl. ..... 156/137; 156/158; 156/159; 156/304.1; 156/304.4; 156/304.5; 156/304.6
(58) Field of Classification Search .................. 156/137, 156/159, 258, 304.1, 304.3, 304.4, 304.5, 156/304.6
See application file for complete search history.

(56) References Cited

U.S. PATENT DOCUMENTS

| | | | | |
|---|---|---|---|---|
| 2,181,274 A * | 11/1939 | Jackson et al. | ................ | 219/670 |
| 3,700,009 A * | 10/1972 | Cushman | ...................... | 140/111 |
| 3,868,762 A * | 3/1975 | Nilsson | ......................... | 228/107 |
| 5,083,985 A * | 1/1992 | Alles | ............................. | 474/253 |
| 5,240,131 A * | 8/1993 | Keller | ........................... | 215/230 |
| 5,512,104 A * | 4/1996 | Mizushiri et al. | ................. | 134/1 |
| 6,086,806 A * | 7/2000 | Weatherall et al. | ........... | 264/152 |

FOREIGN PATENT DOCUMENTS

| | | | |
|---|---|---|---|
| DE | 102006058471 A1 * | 6/2008 | |
| JP | 2000-507893 A | 6/2000 | |
| JP | 2006001712 A * | 1/2006 | |

* cited by examiner

*Primary Examiner* — Matthew Daniels
*Assistant Examiner* — Scott W Dodds
(74) *Attorney, Agent, or Firm* — Buchanan Ingersoll & Rooney PC (57) ABSTRACT

A connection method for interconnecting end portions of a thermoplastic resin long body in which conductive unstretchable members are embedded within the thermoplastic resin along a longitudinal direction, wherein the unstretchable members in each of specific sections in the both end portions of the thermoplastic resin long body are heated using an induction heating portion so that the thermoplastic resin coating the unstretchable members is removed by melting for the unstretchable members to be exposed, after which the both end portions are interconnected while they are held in a state where the unstretchable members being exposed in the respective end portions are butt-connected to each other.

7 Claims, 7 Drawing Sheets

CONNECTION METHOD OF THERMOPLASTIC RESIN LONG BODY

BACKGROUND OF THE INVENTION

1. Field of the Invention

The present invention relates to a connection method of a thermoplastic resin long body for interconnecting the end portions of a long body made of thermoplastic resin in which conductive unstretchable members are embedded within the thermoplastic resin, such as a moving handrail of a passenger conveyer or an escalator.

2. Background Art

A moving handrail of a passenger conveyer, an escalator, or the like includes, as chief members, a handrail main body normally made of rubber or a thermoplastic resin material, a large number of long slender copper cables (tensile bodies) embedded within the handrail main body along the longitudinal direction, and a canvas laminated to the under side of the handrail main body.

The copper cables function as a stretch preventing member that provides the handrail with a desired strength in the longitudinal direction while at the same time they are allowed to bend in the vertical direction to make the handrail movable about rollers and a drive mechanism. The canvas is bonded to the handrail in a T-shaped channel at the bottom of the handrail and is furnished with a function to reduce a frictional coefficient between the main body guide and the moving handrail.

The moving handrail is first formed as a thermoplastic resin long body and completed as a final product when it is processed in the form of a loop having a desired length by interconnecting the end portions of the long body. For example, JP-T-2000-507893 proposes to cut the end portions in alternating complex patterns with a cutting tool in order to obtain a sufficient bonding strength when the end portions of the long body are interconnected. The process to form the alternating patterns in the end portions, however, requires a cutting process to separate the handrail main body, a large number of copper cables, and the canvas as well as a cutting process to form the patterns.

The cutting processes using a cutting tool as above have a problem that it takes a long processing time to process thermoplastic resin widely and long (or deeply and long). In particular, the process to separate the handrail main body and a large number of copper cables requires a certain degree of processing accuracy. This raises a problem that the processing speed cannot be increased.

In addition, by merely butt-connecting the tips of the copper cables when interconnecting the end portions of the thermoplastic resin long body, in a case where the long body is used as a moving handrail, there arises a problem resulting from aging that the copper cables break through the thermoplastic resin and come out to the surface of the moving handrail.

SUMMARY OF THE INVENTION

The invention was devised to solve the problems discussed above and has an object to provide a connection method for connecting, in a short time and in a reliable manner, the end portions of a long body made of thermoplastic resin in which conductive unstretchable members are embedded within the thermoplastic resin along the longitudinal direction, such as a moving handrail of a passenger conveyer or an escalator.

A connection method of a thermoplastic resin long body according to one aspect of the invention for interconnecting end portions of a long body made of thermoplastic resin in which conductive unstretchable members are embedded within the thermoplastic resin along a longitudinal direction is configured in such a manner that the unstretchable members in each of specific sections in the both end portions of the thermoplastic resin long body are heated using an induction heating portion so that the thermoplastic resin coating the unstretchable members in the specific sections is removed by melting for the unstretchable members to be exposed, after which the both end portions are interconnected while the both ends are held in a state where the unstretchable members being exposed in one end portion and in the other end portion are butt-connected to each other.

According to the invention, by heating the unstretchable members per se to a desired temperature (basically, a temperature at which the thermoplastic resin melts) by the induction heating portion, it becomes possible to separate the thermoplastic resin and the unstretchable members by melting the thermoplastic resin coating the periphery of the unstretchable members. The thermoplastic resin and the unstretchable members can be therefore separated in a short time and in a reliable manner.

Also, in a case where the thermoplastic resin and the unstretchable members are separated, the thermoplastic resin and the unstretchable members can be processed separately as individual members when forming the end portion shapes necessary to interconnect the end portions of the thermoplastic resin long body. This facilitates the cutting process and the like.

In addition, because the thermoplastic resin is melted only on the periphery of the unstretchable members, not only can the separation process be performed without deteriorating the quality and the function as a moving handrail of a passenger conveyer or an escalator, but also the separation process can be performed at satisfactory workability because the shape as the thermoplastic resin long body remains stable.

Further, in a case where the unstretchable members are physically connected to each other, not only is it possible to ensure the strength as the moving handrail, but it is also possible to prevent deterioration of the quality, such as an event resulting from aging that the unstretchable members protrude to the surface of the moving handrail.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 2A is a plan view, FIG. 2B is a side view.

FIG. 11A is a plan view and FIG. 11B is a side view used to describe one step in a connection method of a resin long body according to a second embodiment of the invention;

DESCRIPTION OF THE PREFERRED EMBODIMENTS

First Embodiment

Figure 1:
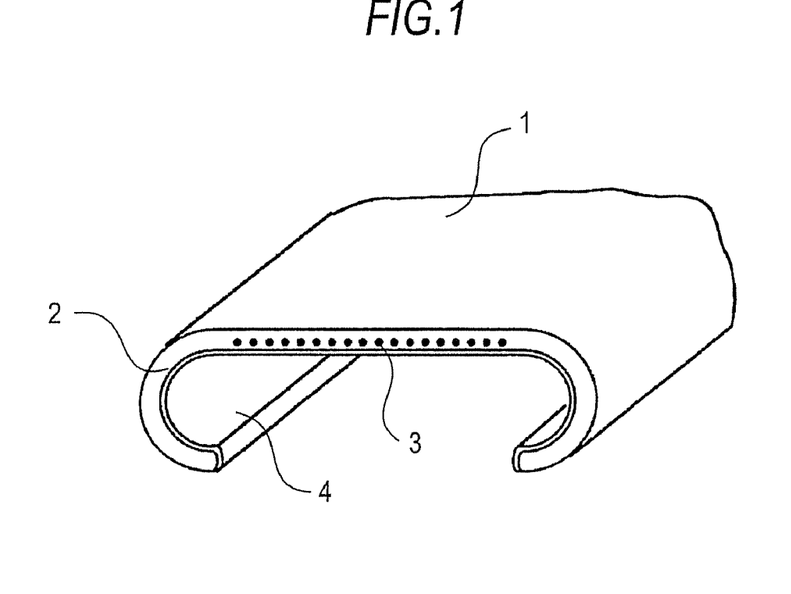
FIG. 1 is a perspective end view of a moving handrail of a passenger conveyer.

FIG. 1 is perspective end view of a long body made of thermoplastic resin (hereinafter, referred to as the resin long body) 1 used for handrails of a passenger conveyor or the like. Referring to FIG. 1, the resin long body 1 is formed of a thermoplastic resin 2, for example, urethane, conductive, long slender unstretchable members 3, for example, copper cables, embedded within the thermoplastic resin 2 and playing a role of a stretch preventing member that provides the resin long body 1 with a desired strength in the longitudinal direction, and a supporting fabric 4, such as a canvas, laminated to the under side in order to reduce a frictional coefficient between the resin long body 1 and a traveling guide (not shown).

The resin long body 1 configured as above is finished as a final product, such as a moving handrail of a passenger conveyer, as it is processed in the form of a loop having a desired length by interconnecting the end portions.

Hereinafter, a method for interconnecting the end portions of the resin long body 1 will be described.

Figure 2A:
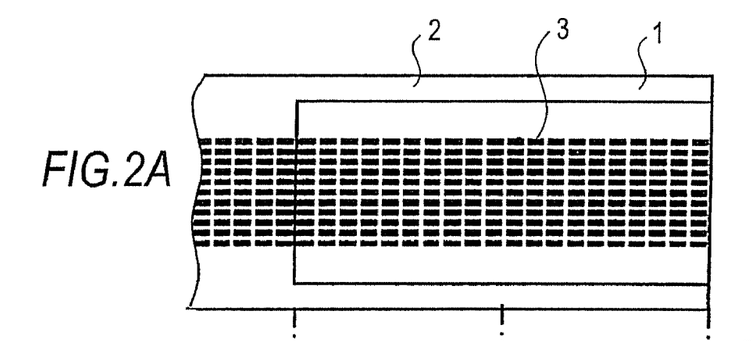
Figure 2B:
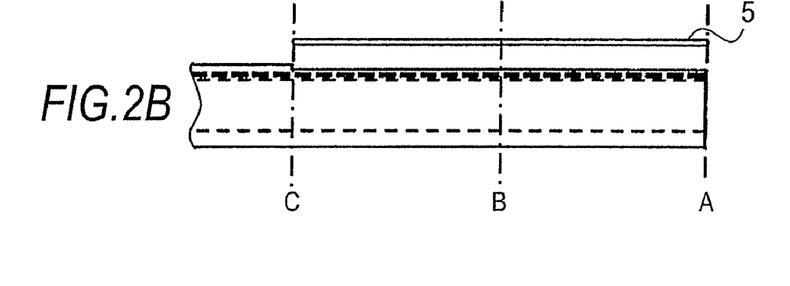
Figure 2C:
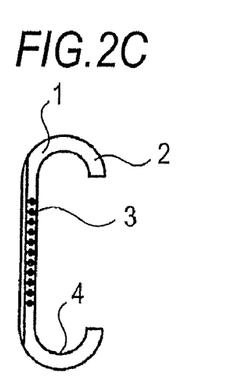
FIG. 2C is an end view used to describe one step in a connection method of a resin long body according to a first embodiment of the invention.

Firstly, a processing method at one end of the resin long body 1 will be described. As are shown in FIGS. 2A through 2C, the upper portion of the thermoplastic resin 2 is sliced as is indicated by a sliced piece 5 up to a portion C spaced apart by a predetermined distance in the longitudinal direction from an end face A at one end of the resin long body 1. Subsequently, cuts are made in curved thermoplastic resin portions on the right and left in an intermediate portion B between the end face A and the portion C. Finally, cuts are made from the supporting fabric 4 side while leaving the unstretchable members 3 flawless. In this instance, cuts are made so that the thermoplastic resin 2 of about several millimeters (for example, 1 to 2 mm) is left on the periphery of the unstretchable members 3.

Figure 3:
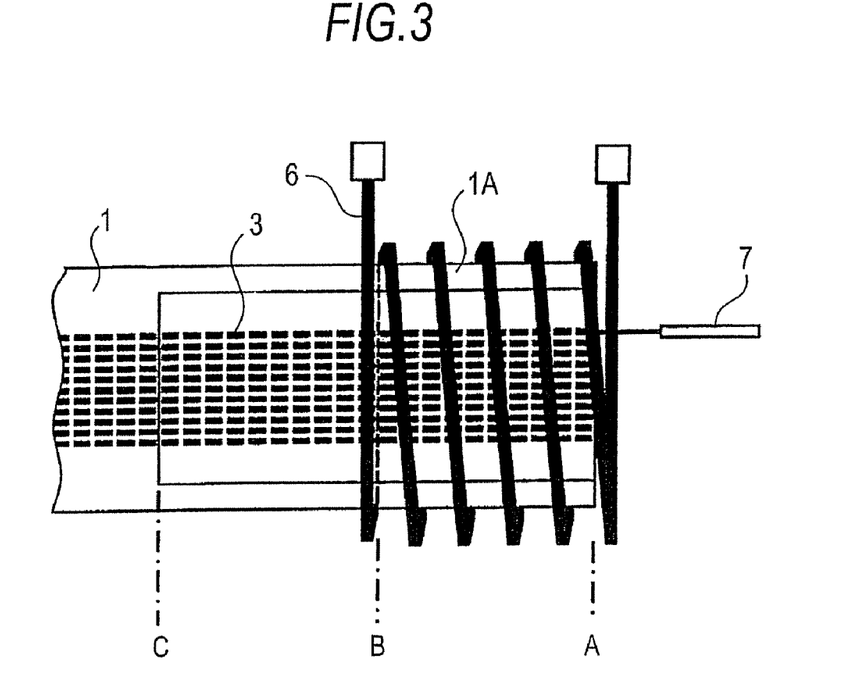
FIG. 3 is a plan view used to describe another step in the first embodiment of the invention.

Then, as is shown in FIG. 3, a section 1A between the end face A and the intermediate portion B of the resin long body 1, in which it is cut so that the thermoplastic resin 2 is left only on the periphery of the unstretchable members 3, is placed in an induction heating coil serving as an induction heating portion 6. The unstretchable members 3 in the section 1A are thus inductively heated.

The temperature of the unstretchable members 3 in the section 1A rises owing to this induction heating and so does the temperature of the thermoplastic resin 2 coating the periphery of the unstretchable member 3.

Figure 4A:
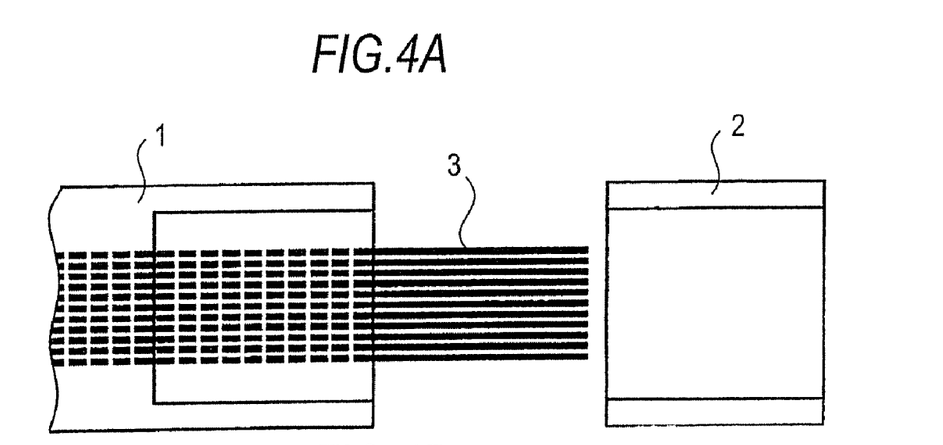
FIG. 4A is a plan view and FIG. 4B is a side view used to describe still another step in the first embodiment of the invention.
Figure 4B:
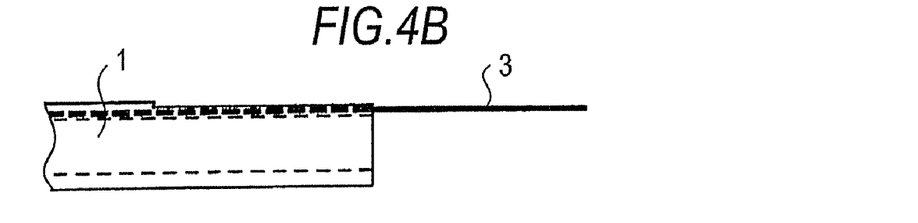

When the temperature exceeds the melting temperature of the thermoplastic resin 2 (about 160° C. in the case of urethane), the strength on the periphery of the unstretchable members 3 is lowered. In this instance, by pulling the thermoplastic resin 2 in the section 1A in the longitudinal direction from the end face of the resin long body 1, as are shown in FIGS. 4A and 4B, it becomes possible to remove the thermoplastic resin 2 in the section 1A alone, thereby causing the unstretchable members 3 in the section 1A to be exposed.

In this case, in order to maintain the temperature of the unstretchable members 3, which are the subjects to be heated, at a constant temperature (for example, 200° C. to 250° C. in the case of urethane) or in a predetermined pattern during the induction heating, a temperature rise of the unstretchable members 3 is monitored by a thermo couple 7 and fed back to a control system of the induction heating portion 6.

In addition, the induction heating portion 6 may be controlled not only to maintain the temperature of the unstretchable members 3 but also to maintain the hardness of the thermoplastic resin 2 that is softened due to influences of the unstretchable members 3 heated by the induction heating portion 6 at a predetermined value.

As an example of a method for controlling the temperature of the unstretchable member 3 or the hardness of the thermoplastic resin 2 at a predetermined value, the temperature being monitored by the thermo couple 7 is fed back to the control system of an induction heating device (not shown) to compare the fed back value with the predetermined set value, so that turning ON and OFF of an output of the induction heating device is controlled on the basis of the comparison result (the induction heating is turned OFF when the monitored value exceeds the predetermined value and the induction heating is turned ON when the former is smaller than the latter).

A processing method for the other end of the resin long body 1 will now be described.

Figure 5:
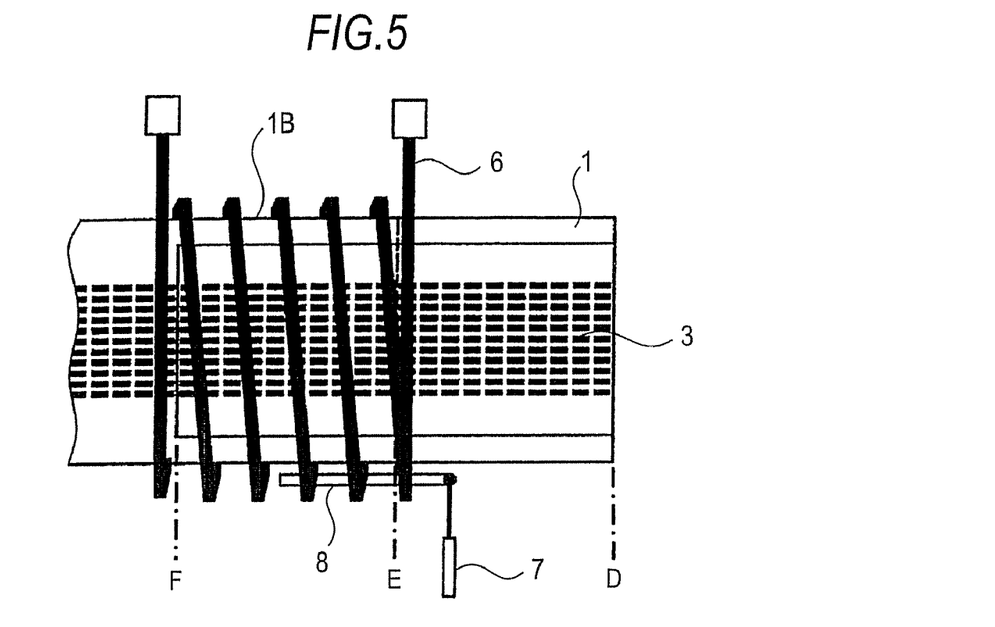
FIG. 5 is a plan view used to describe still another step in the first embodiment of the invention.

As is shown in FIG. 5, a portion E spaced apart by a predetermined distance in the longitudinal direction from the end face D at the other end of the resin long body 1 and a portion F spaced apart by a predetermined distance from the portion E in the direction opposite to the end face D are set. The upper portion of the thermoplastic resin 2 present between the end face D and the portion F is sliced. Subsequently, cuts are made in curved thermoplastic resin portions on the right and left in the portion E. Finally, cuts are made from the supporting fabric 4 side while leaving the unstretchable members 3 flawless. In this instance, cuts are made so that the thermoplastic resin 2 of about several millimeters (for example, 1 to 2 mm) is left on the periphery of the long slender unstretchable members 3. The configuration is the same in this regard as in the case described with reference to FIGS. 2A through 2C.

Subsequently, as is shown in FIG. 5, a section 1B between the portions E and F of the resin long body 1 is placed in the induction heating coil serving as the induction heating portion 6, so that the unstretchable members 3 in the section 1B are inductively heated.

The basic change in state caused by this induction heating is the same as in the case described with reference to FIG. 3. However, in contrast to the case of FIGS. 4A and 4B where a part of the resin long body 1 is separated completely, as are shown in FIGS. 6A and 6B, the thermoplastic resin portion in the section 1B is left intact and instead the unstretchable members 3 are peeled off from the thermoplastic resin 2 in this case.

In this case, too, in order to maintain the temperature of the unstretchable members 3, which are the subjects to be heated, at a constant temperature (for example, about 200° C. to 250° C. in the case of urethane) or in a predetermined pattern during the induction heating, a dummy load 8 made of the same material as the unstretchable members 3 is placed in the induction heating coil serving as the induction heating portion 6. A temperature rise of the dummy load 8 during the induction heating is monitored by the thermo couple 7 and fed back to the control system of the induction heating portion 6.

In addition, the induction heating portion 6 may be controlled not only to maintain the temperature of the unstretchable members 3 but also to maintain the hardness of the thermoplastic resin 2 that is softened due to influences of the unstretchable members 3 heated by the induction heating portion 6 at a predetermined value.

Figure 6A:
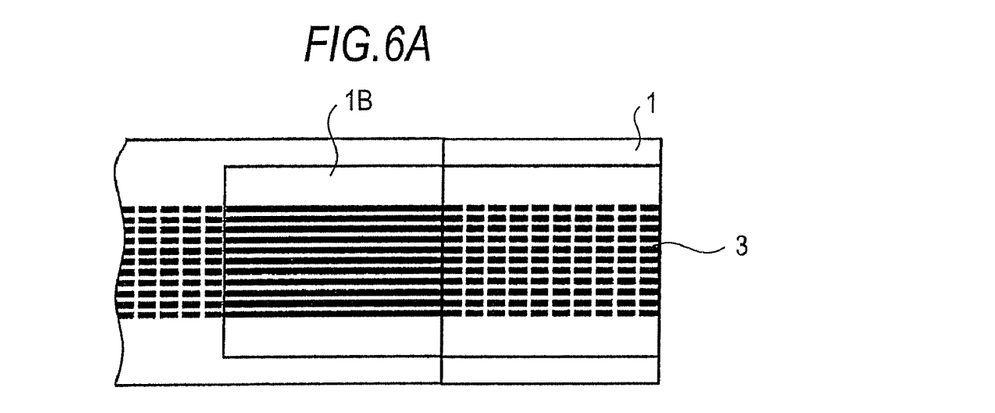
FIG. 6A is a plan view and FIG. 6B is a side view used to describe still another step in the first embodiment of the invention.
Figure 6B:
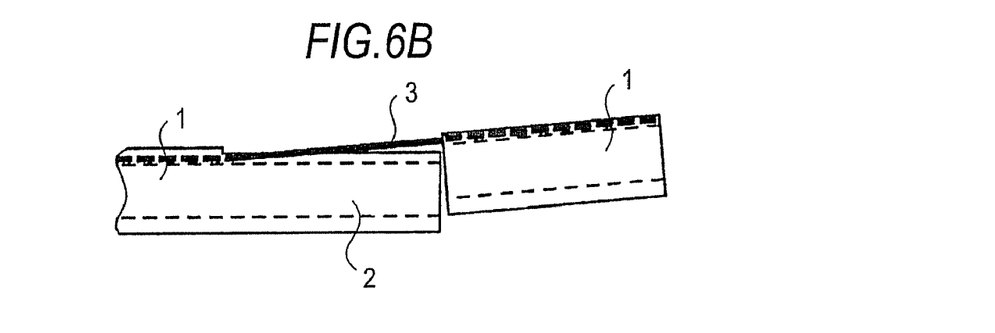

In a state as are shown in FIGS. 6A and 6B where the unstretchable members 3 are peeled off from the resin long body 1, the surface (thermoplastic resin) of the resin long body 1 in a portion where the unstretchable members 3 have been peeled off is roughened. It is therefore preferable to apply a process to smoothen this surface.

The procedure to interlink the end portions of the resin long body 1 processed as above will now be described.

Figure 7A:
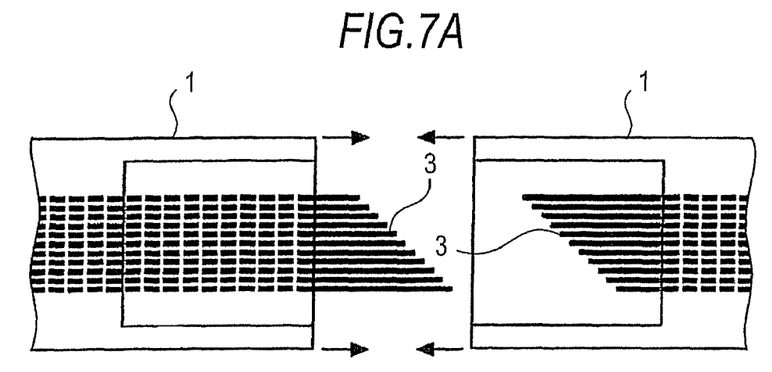
FIG. 7A is a plan view and FIG. 7B is a side view used to describe still another step in the first embodiment of the invention.
Figure 7B:
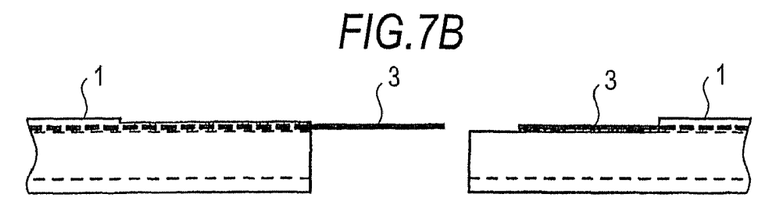

FIGS. 7A and 7B show a state where the both ends of the resin long body 1 are opposed to each other after the unstretchable members 3 exposed from the respective end portions are cut diagonally to arrange the shape in order to link the resin long body 1 whose end portions have been processed as has been described with reference to FIG. 3 through FIG. 6B.

Figure 8A:
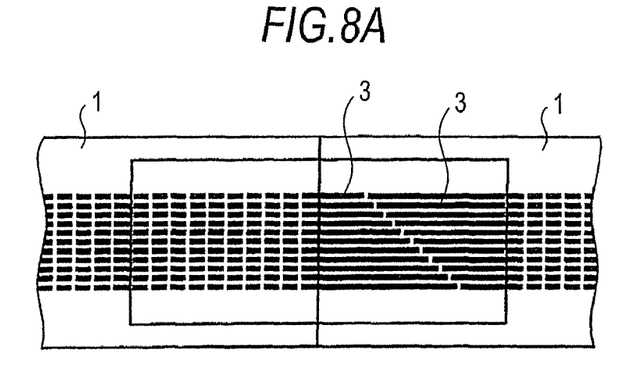
FIG. 8A is a plane view and FIG. 8B is a side view used to describe still another step in the first embodiment of the invention.
Figure 8B:
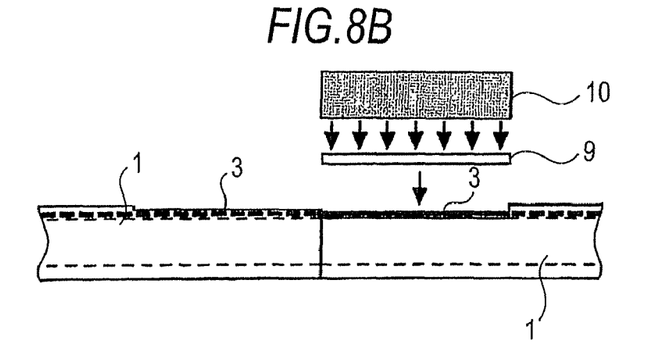

Initially, as are shown in FIGS. 8A and 8B, from the state in FIGS. 7A and 7B, exposed portions of the unstretchable members 3 being exposed are coated, for example, with a sheet of supplementary thermoplastic resin 9 in order to fix the unstretchable members 3 being exposed while the end portions of the resin long body 1 are held in a state where the unstretchable members 3 being exposed in the one end portion and in the other end portion are butt-connected to each other. Subsequently, the unstretchable members 3 are fixed by heating these portions using a heating block 10.

Figure 9A:
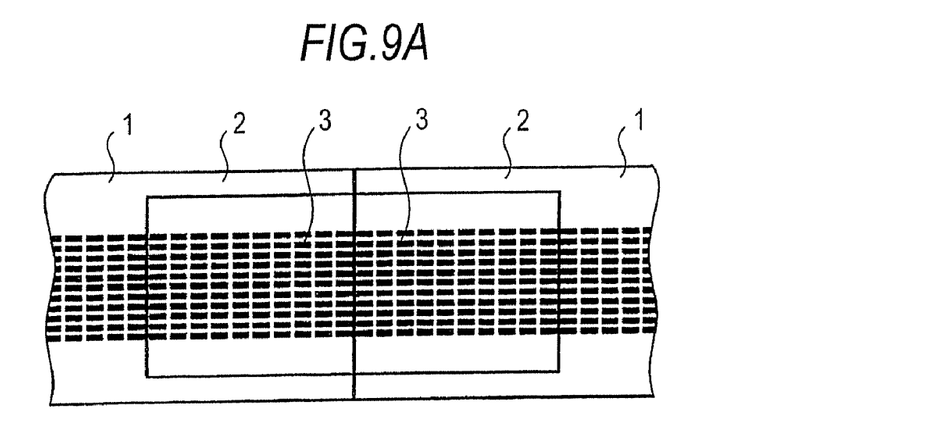
FIG. 9A is a plan view and FIG. 9B is a side view used to describe still another step in the first embodiment of the invention.
Figure 9B:
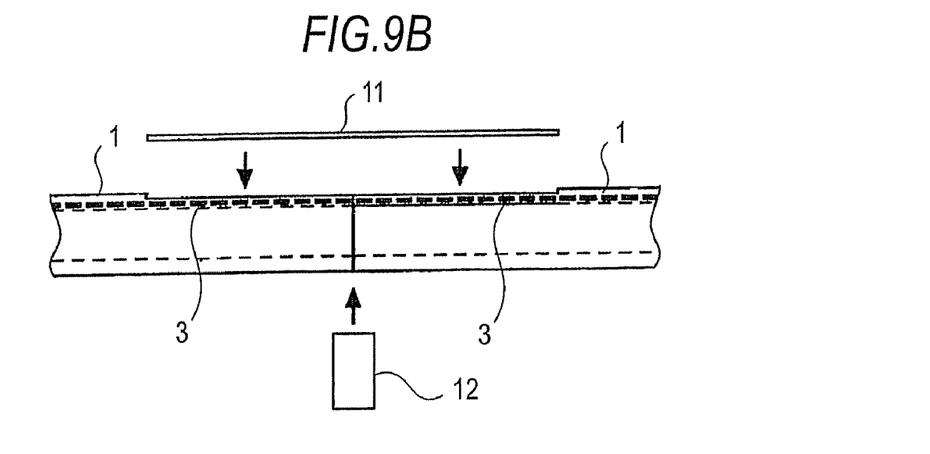

Then, as are shown in FIGS. 9A and 9B, a connection fabric 12, such as a canvas, is laminated to a portion where there is a cut in the supporting fabric 4 using an adhesive or the like from the under side of the resin long body 1. The connected portion in this state is set in a die 13 shown in FIGS. 10A and 10B. For example, a sheet of thermoplastic resin 11 for design surface is applied to a portion where the end portions of the resin long portion 1 are butt-connected to each other. Then, after the die 13 is closed, the die 13 is heated by passing a current to heaters 17 in the die 13.

Figure 10A:
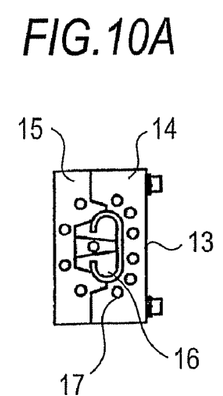
FIG. 10A is an end view and FIG. 11B is a side view showing a die used when interconnecting end portions of the resin long body in the first embodiment of the invention.
Figure 10B:
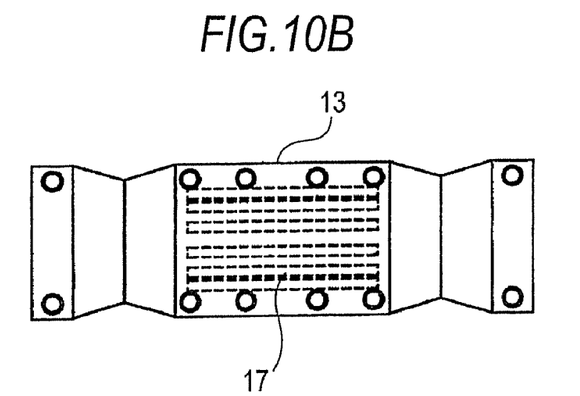

Accordingly, the portions where the end portions of the resin long body 1 are butt-connected are melted and joined to each other. Thereafter, the current flowing into the heaters 17 is stopped and the resin long body 1 connected in the form of a loop is taken out after the die 13 is cooled. Referring to FIGS. 10A and 10B, numeral 14 denotes an upper die, numeral 15 denotes a lower die, and numeral 16 denotes a center core.

As has been described, according to the first embodiment, in the connection method of a resin long body for interconnecting the end portions of the resin long body 1 in which the conductive unstretchable members 3 are embedded within thermoplastic resin 2 along the longitudinal direction, the unstretchable members 3 in each of the specific sections at the both end portions of the resin long body 1 are heated by the induction heating portion 6, so that the thermoplastic resin 2 coating the unstretchable members 3 is removed by melting for the unstretchable members 3 to be exposed, after which the both end portions of the resin long body 1 are connected while they are held in a state where the unstretchable members 3 being exposed in one end portion and in the other end portion are butt-connected to each other. Accordingly, in a case where the end portions of the resin long member to be used for the handrail of a passenger conveyer or the like are interconnected, the thermoplastic resin 2 and the unstretchable member 3 can be separated in a short time and in a reliable manner by applying the heating process using induction heating. The work efficiency can be therefore enhanced (the induction heating is characterized by its high efficiency and fast temperature rising because a subject to be heated directly generates heat).

Also, by applying induction heating in such a manner that the temperature of the unstretchable members 3, which are the subjects to be heated, is maintained at a predetermined value or in a predetermined pattern during the induction heating, it is possible to process the end portions without impairing the quality and the function as the resin long body 1, such as the moving handrail of a passenger conveyer.

Further, by controlling the induction heating portion in such a manner so as to maintain the hardness of the thermoplastic resin 2 that is softened due to influences of the unstretchable member 3 at a predetermined value during the induction heating, it is possible to suppress deterioration of the quality and function of the thermoplastic resin 2, such as the hardness.

Second Embodiment

FIGS. 11A and 11B and FIGS. 12A and 12B are views used to describe a manner in which the unstretchable members 3 at the both end portions are physically connected to each other when interconnecting the end portions of the resin long body on the basis the connection method of the resin long body of the first embodiment above.

In the first embodiment above, as are shown in FIGS. 7A and 7B, the unstretchable members 3 in the both end portions are cut diagonally first and thence butt-connected to each other. A purpose of this configuration is to ensure the strength in a connected portion where the end portions of the resin long body 1 are interconnected in a case where the resin long body 1 is used as the moving handrail of a passenger conveyor or an escalator. In other words, in a case where the butt-connected portions of the unstretchable members 3 are concentrated when the cross section of the moving handrail is viewed at right angles with respect to the traveling axis, because the mechanical strength totally depends on the thermoplastic resin alone, the strength is lowered.

Figure 11A:
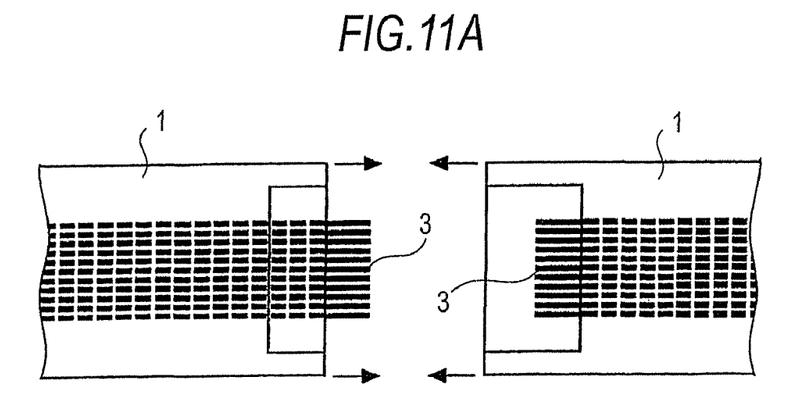
Figure 11B:
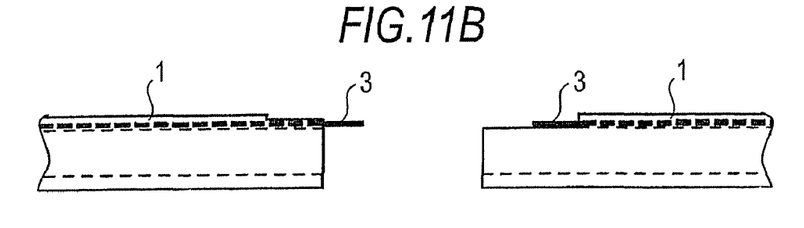
Figure 12A:
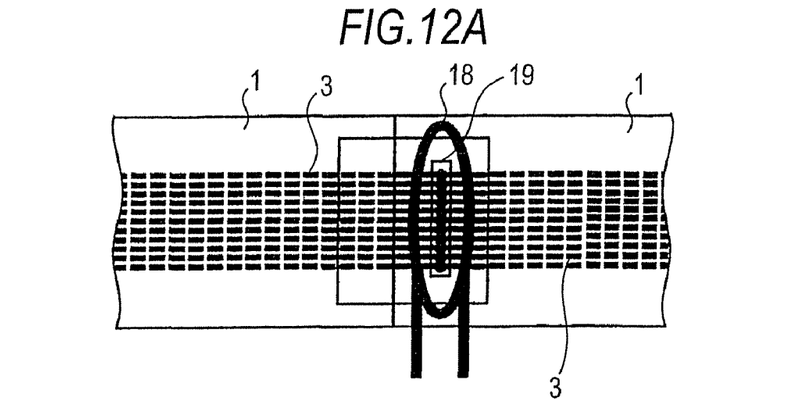
FIG. 12A is a plan view and FIG. 12B is a side view used to describe another step in the second embodiment of the invention.
Figure 12B:
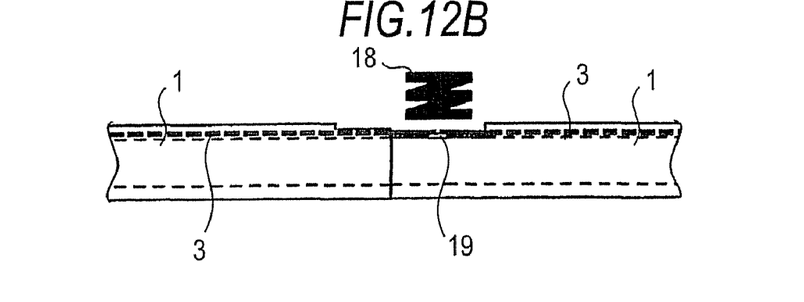

In the second embodiment, in order to further enhance the strength in the connected portion where the end portions of the resin long body 1 are interconnected, as a method for physically connecting the respective unstretchable members 3, as is shown in FIGS. 11A and 11B, the unstretchable members 3 being exposed are cut at right angles with respect to the longitudinal direction to arrange the shape and the both ends of the resin long body 1 are opposed to each other. In this state, the cut portions of the unstretchable members 3 are placed on a connection supporting plate 19 when the both ends of the resin long body 1 are butt-connected to each other as are shown in FIGS. 12A and 12B. The portion is then heated by means of induction heating or the like using a heating coil 18 to raise the temperature of this portion. A physical connection (for example, brazing, soldering, welding, bonding, and so forth) is thus applied.

Consequently, it becomes possible to increase the mechanical strength in the portion where the end portions of the resin long body 1 are interconnected. In addition, because all of the unstretchable members 3 can be cut in the same length and butt-connected, it becomes possible to shorten the portions in the end portions of the resin long body 1 to which the process is applied. The workability can be therefore enhanced and it is possible to achieve an effect that leads to a reduction of the processing time.

Figure 13A:
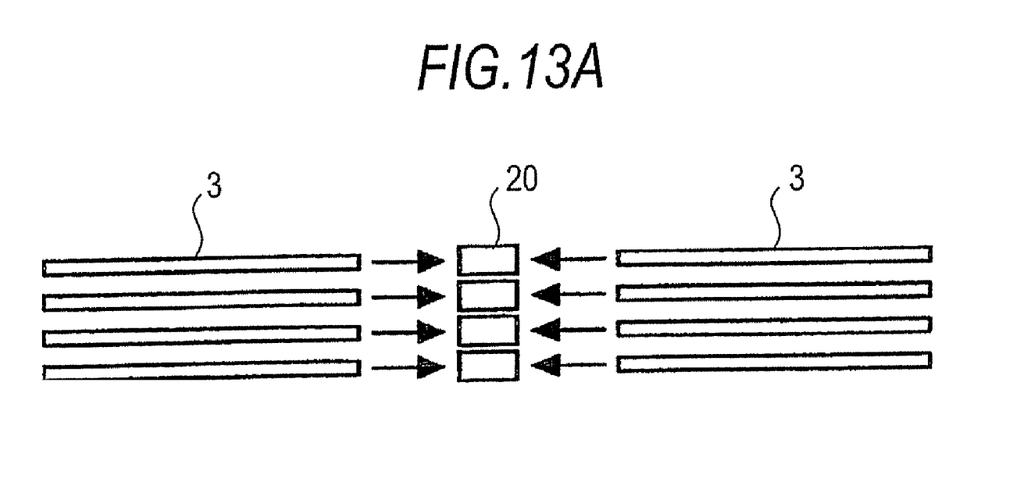
FIG. 13A and FIG. 13B are plane views used to describe another example of the second embodiment of the invention, FIG. 13A showing a state before a process is applied and FIG. 13B showing a state after the process is applied.
Figure 13B:
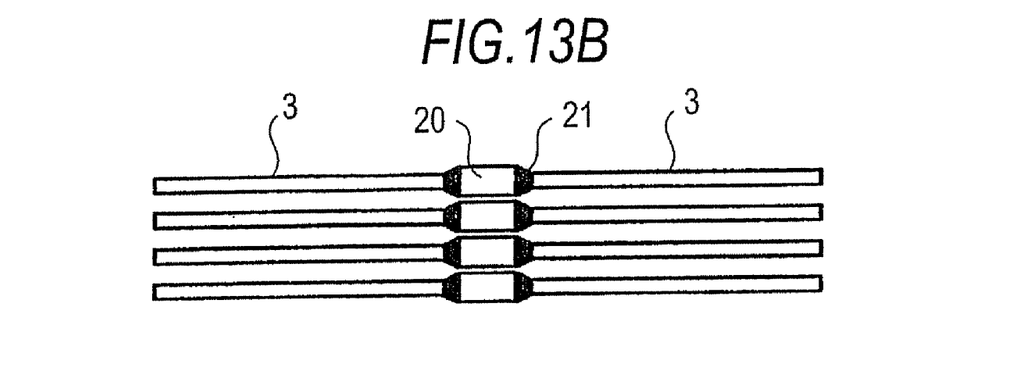

FIGS. 13A and 13B show an example where the respective unstretchable members 3 are connected. Herein, the respective unstretchable members 3 are connected with connection materials 21, such as brazing, using connection caps 20, such as steel rings, as connection supporting members for connecting the respective unstretchable members 3. In a case where the connection caps 20 are used, when the unstretchable members 3 are butt-connected to each other, the connected portion can be covered entirely with a metal material. It is therefore possible to achieve an effect that the mechanical strength can be further increased.

Figure 14:
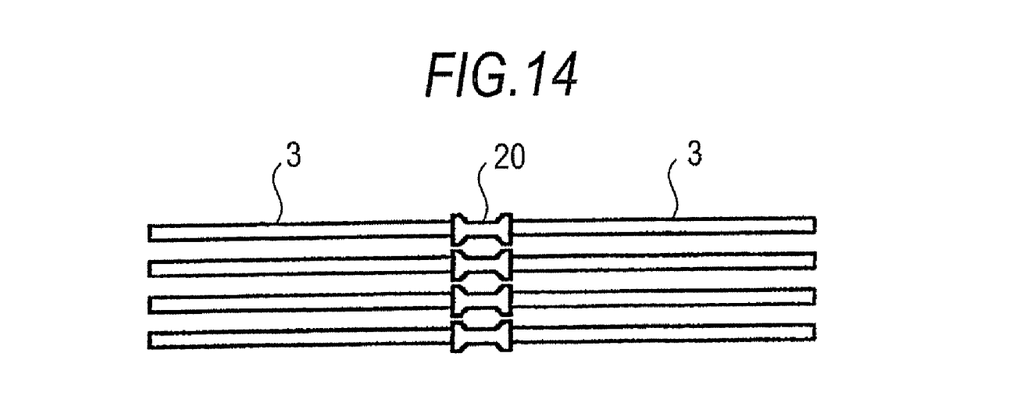
FIG. 14 is a plan view used to describe still another example of the second embodiment of the invention.

FIG. 14 is a view showing a case where the connection caps 20 are fixed by caulking as another example where the respective unstretchable members 3 are connected. In this case, there is no need to heat the connected portion. Hence, in addition to the effect described above, the workability can be enhanced further and it is possible to achieve an effect that leads to a reduction of the processing time.

The connection supporting members, such as the connection caps 20, may be used in the form of separate individual elements or a set of more than one connection cap linked together.

Various modifications and alterations of this invention will be apparent to those skilled in the art without departing from the scope and spirit of this invention, and it should be understood that this is not limited to the illustrative embodiments set forth herein.

What is claimed is:

1. A connection method of a thermoplastic resin long body for interconnecting end portions of a long body made of thermoplastic resin in which conductive substantially unstretchable members are embedded within the thermoplastic resin along a longitudinal direction, comprising:
   a first step of cutting a first portion of the thermoplastic resin long body, spaced apart in a longitudinal direction of the thermoplastic resin long body from a first end face at one end by a predetermined distance while not cutting a periphery of the unstretchable members;
   a second step of heating the unstretchable members in a first section between the first end face and the first portion using an induction heating portion for melting the thermoplastic resin coating the unstretchable members, so that the unstretchable members are exposed by removing the thermoplastic resin in the first section alone;
   a third step of cutting a second portion of the thermoplastic resin long body spaced apart in the longitudinal direction of the thermoplastic resin long body from a second end face at an other end of the thermoplastic resin long body by a predetermined distance while not cutting a periphery of the unstretchable members;
   a fourth step of heating the unstretchable members in a second section between the second portion and a portion spaced apart by a predetermined distance from the second portion in a direction opposite to the second end face for melting and removing the thermoplastic resin coating the unstretchable members to peel off the unstretchable members in the second section from the thermoplastic resin and cutting the unstretchable members that have been peeled, so that the unstretchable members that have been peeled and cut are exposed on the thermoplastic resin in the second section; and
   a fifth step of connecting both ends of the thermoplastic resin long body by coating exposed portions of the unstretchable members with supplementary thermoplastic resin while one end of the thermoplastic resin long body from which the unstretchable members are exposed in the second step and the other end of the thermoplastic resin long body from which the unstretchable members are exposed on the thermoplastic resin in the fourth step are held in a state where the unstretchable members being exposed at one end and at the other end are butt-connected to each other.

2. The connection method of a thermoplastic resin long body according to claim 1, further comprising:
   a sixth step of laminating a connection fabric to an under side of a connection portion of the thermoplastic resin long body first and thence applying the thermoplastic resin long body for design on an upper side of the connection portion followed by heating the connection portion using a die.

3. The connection method of a thermoplastic resin long body according to claim 1, further comprising:
   controlling the induction heating portion in such a manner that a temperature of the unstretchable members heated by the induction heating portion is maintained at a constant temperature or in a predetermined temperature pattern.

4. The connection method of a thermoplastic resin long body according to claim 1, further comprising:
   controlling the induction heating portion in such a manner that hardness of the thermoplastic resin that is softened due to an influence of the unstretchable members heated by the induction heating portion is at a predetermined value.

5. The connection method of a thermoplastic resin long body according to claim 1, wherein:
   in the fifth step, the unstretchable members being exposed at one end and at the other end are physically connected to each other before the exposed portions of the unstretchable members are coated with the supplementary thermoplastic resin.

6. The connection method of a thermoplastic resin long body according to claim 5, further comprising:
   heating the unstretchable members being exposed at one end and at the other end by means of induction heating while the ends are physically connected to each other.

7. The connection method of a thermoplastic resin long body according to claim 5, comprising:
   controlling the unstretchable members being exposed at one end and at the other end to each other using a connection supporting member.

* * * * *